US006393150B1

(12) United States Patent
Lee et al.

(10) Patent No.: US 6,393,150 B1
(45) Date of Patent: May 21, 2002

(54) REGION-BASED IMAGE BINARIZATION SYSTEM

(75) Inventors: Yongchun Lee, Rochester; Peter Rudak, Hilton, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/205,948

(22) Filed: Dec. 4, 1998

(51) Int. Cl.[7] .................................................. G06K 9/34
(52) U.S. Cl. ........................................ 382/176; 382/256
(58) Field of Search .............................. 382/176, 256, 382/257, 179

(56) References Cited

U.S. PATENT DOCUMENTS

| 4,668,995 A | | 5/1987 | Chen et al. | |
|---|---|---|---|---|
| 4,996,602 A | * | 2/1991 | Ono et al. | 358/457 |
| 5,335,290 A | | 8/1994 | Cullen et al. | |
| 5,568,571 A | * | 10/1996 | Willis et al. | 382/254 |
| 5,617,485 A | * | 4/1997 | Ohuchi et al. | 382/176 |
| 5,872,864 A | * | 2/1999 | Imade et al. | 382/176 |
| 6,072,941 A | * | 6/2000 | Suzuki et al. | 395/109 |
| 6,091,389 A | * | 7/2000 | Maeda et al. | 345/98 |
| 6,125,204 A | * | 9/2000 | Nakatsuka et al. | 382/173 |

* cited by examiner

*Primary Examiner*—Leo Boudreau
*Assistant Examiner*—Ali Bayat
(74) *Attorney, Agent, or Firm*—David A. Novais; Nelson Adrian Blish

(57) ABSTRACT

A region-based binarization system applies adaptive thresholding and image rendering to a gray scale image to generate first and second binary images. The gray scale image can also be subsampled to acquire a low resolution image and locations of photographic images are detected in the low resolution image. Further, photographic images of the detected photographic images which have a rectangular shape are identified and a classification map which distinguishes pixels in the rectangular shaped photographic images from remaining pixels is generated. A final binary image can then be formed from the first and second binary images based on the classification map. The binarization system of the present invention is effective when the gray scale image is captured from a document which contains at least both photographic and text portions.

7 Claims, 11 Drawing Sheets

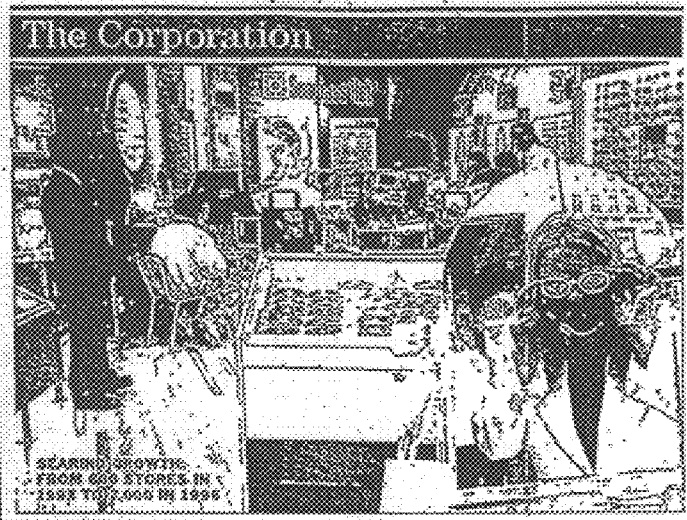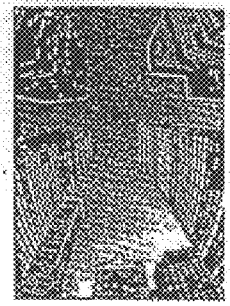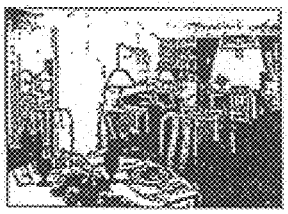
Fig. 4

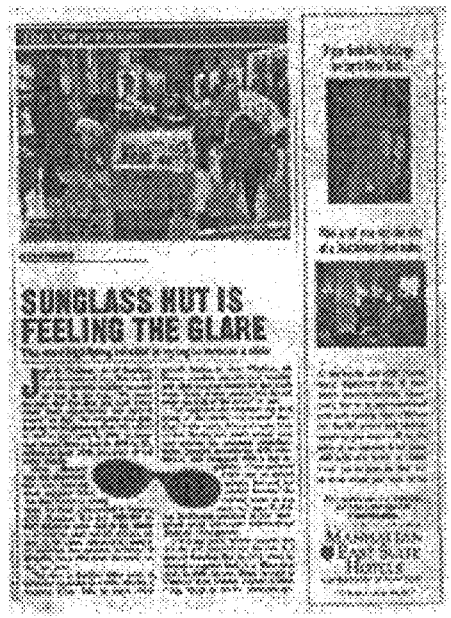
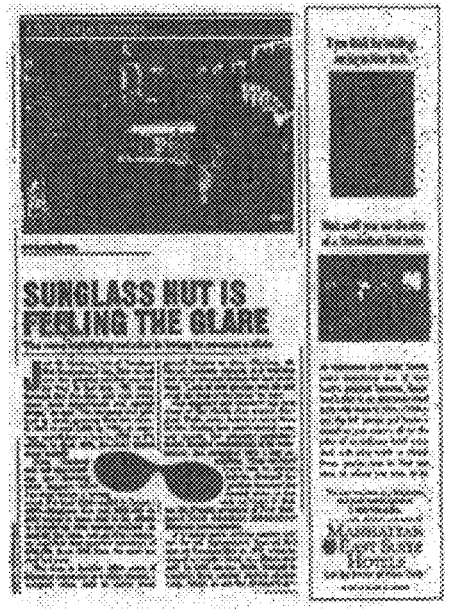
Fig. 6  Fig. 7
Fig. 8

Fig. 13

REGION-BASED IMAGE BINARIZATION SYSTEM

CROSS REFERENCE TO RELATED APPLICATIONS

The present application is related to U.S. patent application Ser. No. 08/739,076, filed Oct. 25, 1996, by Yongchun Lee titled "A Look-Up-Table (LUT) Technique For Conversion Of A Bitmap Into Polygonal Representation".

FIELD OF THE INVENTION

The present invention relates to a region-based binarization system for a mixed type document which provides for optimal binary image quality.

BACKGROUND OF THE INVENTION

A printed page in a magazine often contains photographs mixed with text, line art and graphics. When the page is electronically captured by a scanner, a binarization process is required to convert the captured grey scale image into a bitonal representation of the image at output. There are two common classes of image binarization techniques. One is called an adaptive thresholding technique which is good for the type of documents that mainly contain text and line art. The other is a dither or error diffussion technique which reproduces shades of gray in a form of a binary format. It is effective in binarizing photographic images. In the case of a mixed type of document where text and photographs are contained in the captured document image, either of the two binarization methods cannot produce satisfactory image quality in both text and photographs. A well-known solution to the problem is to segment the captured digital image into regions of photographs and text so that different binary processes can be applied to different regions in order to get optimal image quality.

A known segmentation method divides a mixed type of document into 4-by-4 blocks, classifies each block as text or image, and improves classification by eliminating short runs of blocks (see for example U.S. Pat. No. 4,668,995 to Chen et al.). After blocks of image lines are classified, the different binarization processes are then applied accordingly. Another known method segments an image by extracting run lengths for each scanline, constructing rectangles from the run lengths, then classifying rectangles as either text or non-text, finally merging associated text blocks into text regions (see for example, U.S. Pat. No. 5,335,290 to Cullen et al.).

The two segmentation methods mentioned above are bottom-up segmentation methods which start with pixel-by-pixel or small block-by-block segments of information and expand into regions. They are less robust and prone to classification errors because text or non-text classification is based on local image information only.

SUMMARY OF THE INVENTION

An objective of the present invention is to provide for a top-down segmentation method which locates photographic regions based on global pixel connectivity and proposes a region-based binarization system which uses a segmentation result to obtain optimal binary image quality.

The present invention is related to a region-based binarization system which applies adaptive thresholding and image rendering such as error diffusion (or dither) individually to generate two binary images from a grey scale image; detects the location of photographic images in the low resolution image; identifies the photographic images having a rectangular shape or boundary; generates a classification bitmap which marks a photographic pixel as "1" vs. a non-photographic pixel as "0"; and composes the final binary image based on the classification map from the two stored binary images.

The photographic detection process comprises the steps of converting the low resolution grey scale image into a binary image using a global thresholding; performing a binary image erosion process to remove thin lines and the majority of characters; applying connected component analysis to locate the objects; and using a size filter to exclude small objects. The locations of the large objects are considered as the locations of photographs.

The present invention relates to a region-based binarization process which comprises the steps of: converting a gray scale image into first and second binary images; detecting a location of photographic images in the gray scale image; identifying photographic images of the detected photographic images which have a rectangular boundary; generating a classification map which distinguishes pixels in the photographic images having a rectangular boundary from remaining pixels; and forming a final binary image from the first and second binary images based on the classification map.

The present invention further relates to a region-based binarization process which comprises the steps of: capturing an image; detecting a location of photographic images in the captured image; identifying photographic images of the detected photographic images which have a rectangular boundary; generating a classification map which distinguishes photographic pixels in the photographic images having a rectangular boundary from non-photographic pixels; and forming a final binary image based on the classification map.

The present invention further relates to an image capture assembly which comprises: an image capture section which captures an image; a conversion section which converts the captured image into digital image information indicative of the captured image; and a processing section which processes the digital image information to detect a location of photographic images in the captured image, identifies photographic images of the detected photographic images which have a rectangular boundary, and generates a classification map which distinguishes pixels in the photographic images having a rectangular boundary from remaining pixels.

BRIEF DESCRIPTION OF THE DRAWINGS

FIG. 4 is a thresholded image (B1) of the image (G) in FIG. 3 using an adaptive thresholding method;

FIG. 6 is a subsampled image (Gs) of image (G) in FIG. 3 using a 4:1 size reduction;

FIG. 7 is a thresholded image (Bs) of image (Gs) in FIG. 6 using a fixed thresholding;

FIG. 8 is a resulting binary image (Es) of an image erosion processing for image (Bs) in FIG. 7;

FIG. 13 is the final binary image using the method of the present invention.

DETAILED DESCRIPTION OF THE INVENTION

Figure 1A:
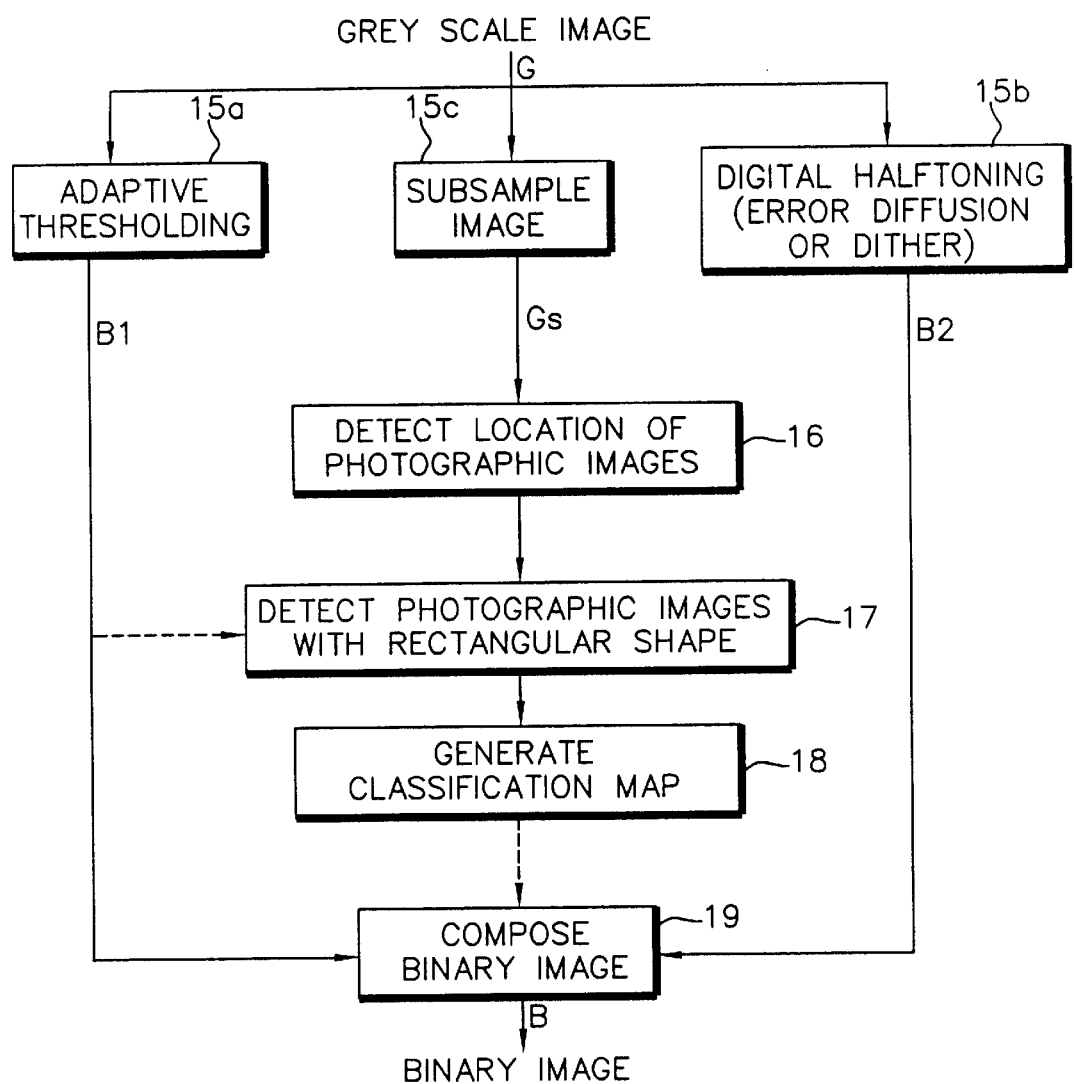
FIG. 1a is a flowchart which illustrates the steps of a region-based binarization system for a mixed type of document.

Referring now to the drawings, wherein like reference numerals represent identical or corresponding parts throughout the figures, a block diagram of a region-based image binarization method is shown in FIG. 1a. In response to digital grey scale image data as input, the method operates as follows: An adaptive image thresholding (step 15a) is applied to convert the grey scale image (G) into a binary image (B1) which shows good image quality in text and line art. An image rendering such as error diffusion or dithering (step 15b) is applied to the same grey scale image (G) to obtain a rendered binary image (B2) which exhibits good image quality in photographic portions of the image. Subsampling of the grey scale image occurs in step 15c so as to provide for a subsampled image ($G_s$). In step 16, the locations of rectangular photographic images are detected in subsampled image ($G_s$), while photographic images with rectangular shapes or boundaries are detected in step 17. The generation of a classification map which marks pixels with "1" in the detected rectangular photographic area and with "0" in other pixels occurs in step 18, and the final binary image (B) is the result of the image composition of the two binary images B1 and B2, based on the the generated classification map. If a pixel at location (i,j) in the generated classification map is marked with "1" which indicates a photographic pixel, the pixel at location (i,j) in the image B2 is copied to the binary image B. On the other hand, if the pixel at location (i,j) in the classification map is a "0" which indicates a text pixel, then the pixel at location (i,j) in the image B is a copy of the binary image B1. In other words, B1 and B2 are combined to form a final binary image.

Figure 1B:
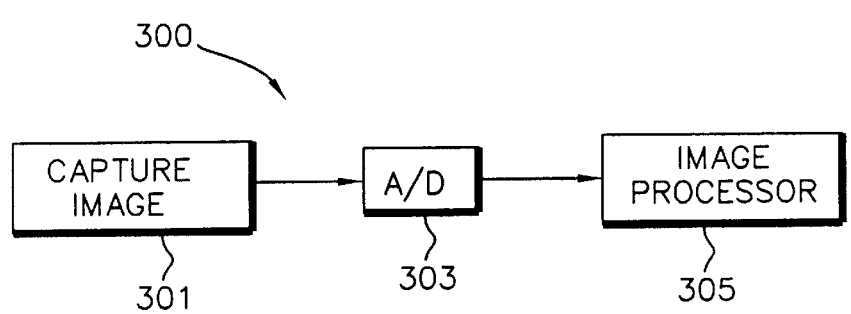
FIG. 1b schematically illustrates an apparatus in accordance with the present invention.

FIG. 1b shows a schematic illustration of an image capture assembly 300 which processes captured images in accordance with the described features of the present invention. Image capture assembly 300 can be a scanner which includes an image capture section 301 in the form of, for example, a charge coupled device that captures an image, and a conversion section 303 in the form, for example, an A/D converter which converts the captured image into digital information indicative of the capture image. The digital information is sent to an image processor 305 which processes the digital information in the manner described with reference to FIG. 1a, and as will be further described with reference to FIGS. 2a and 2b.

Figure 2A:
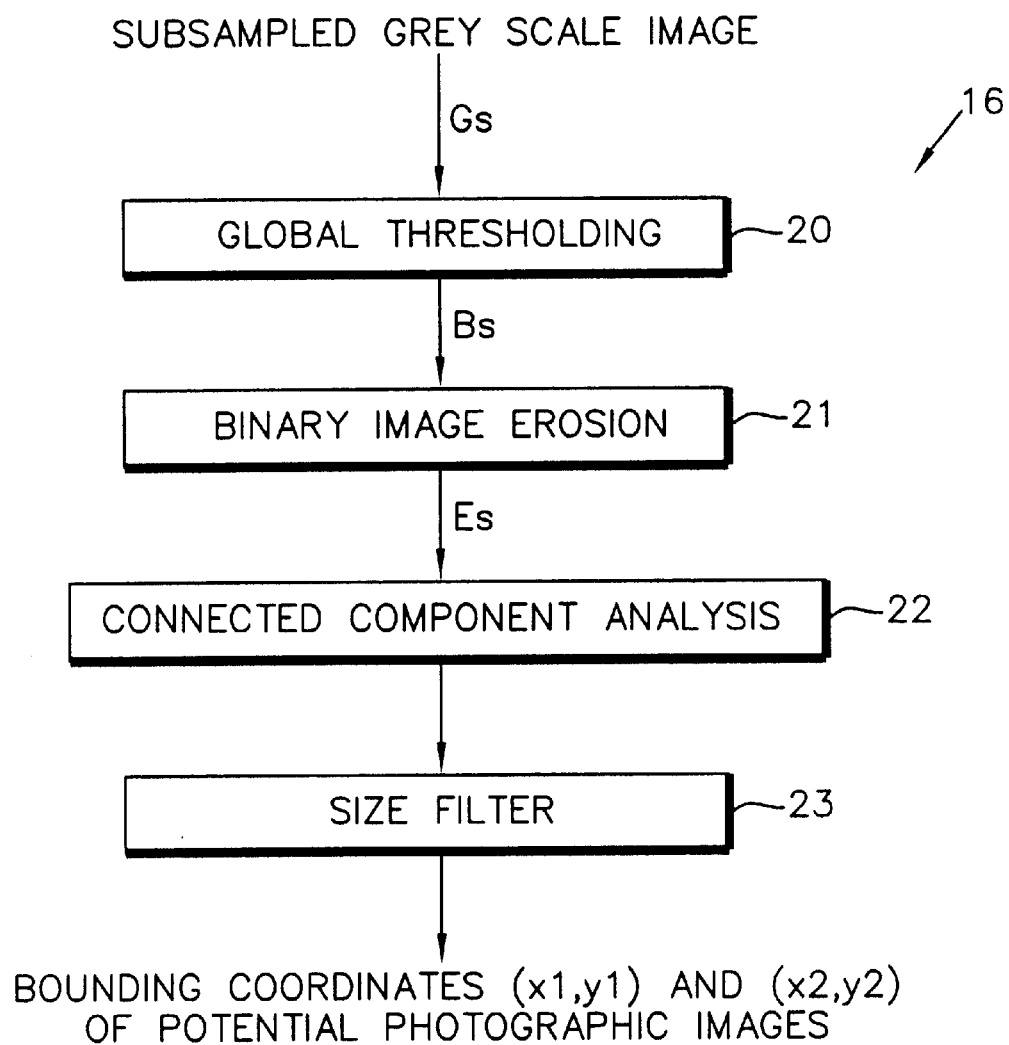
FIG. 2a is a flowchart outlining the steps of a photographic detection process.

The specifics of the detection of photograph images in a mixed type of document (Step 16) is depicted in FIG. 2a. First, in the subsampling step (15c in FIG. 1), the grey scale image is subsampled in every other N pixels and every other N scanlines to obtain a low resolution grey scale image, (Gs). A fixed threshold value (Global Thresholding) (step 20) is supplied to convert the grey scale image (Gs) into a binary image (Bs). A 3-by-3 binary erosion operation (step 21) is applied through every pixel of the binary image to remove thin lines and other thin objects including characters. The resultant image after the image erosion operation is saved as image (Es). A connected component analysis (step 22) is applied to the image (Es) for grouping the connected pixels. Every group of connected pixels is taken as an object. The bounding coordinates of an object defines the location of the object. Based on a size filter (step 23), an object whose bounding size is larger than a size threshold value is considered as a photograph. As one example, the size filter can be scanning resolution dependent.

Demonstration of the Steps of the Method by a Real Example

Figure 3:
FIG. 3 is an example of a digitally printed grey scale compound document (G)
Figure 5:
FIG. 5 is a thresholded image (B2) of the image (G) in FIG. 3 using an error diffusion method.

FIG. 3 is a print of a scanned mixed type of document page in a magazine which contains text, lines, rectangular photographs and non-rectangular graphics (graphics of sunglass). Applying an adaptive thresholding (step 15a, FIG. 1) to the grey scale image in FIG. 3 produces a binary image (B1). The binary image (B1) in FIG. 4 exhibits clear and sharp characters and lines, but the details of shades in the photographs disappear. By applying an error diffusion technique (step 15b, FIG. 1) to the same grey scale image, the resultant binary image (B2) as illustrated in FIG. 5 shows that the image details in the regions of photographs are retained and are closer to realistic photographic quality. However, the text image quality appears blurred. Comparing the two binary image (B1) and (B2), it concludes that to produce a good binary image in a mixed type of document, the combination of adaptive thresholding for text regions and error diffusion for photographic regions is required. To achieve this task, the detection of photographic regions is necessary.

Figure 9:
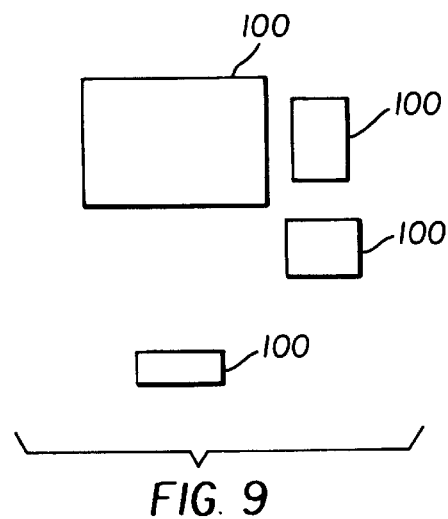
FIG. 9 is the detected bounding boxes of large objects for binary image (E) in FIG. 8.
Figure 10:
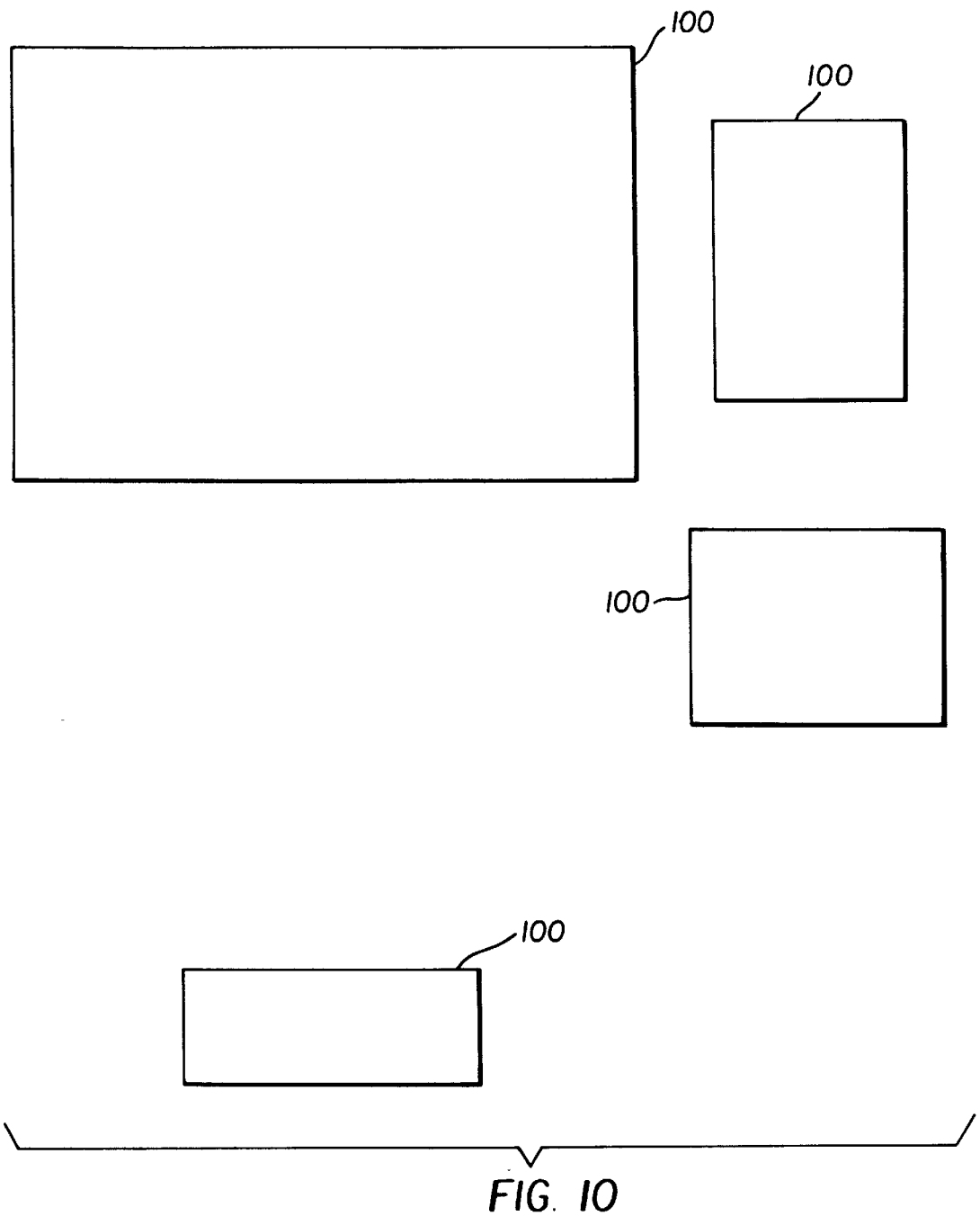
FIG. 10 is the detected locations of photographs in image (B1) in FIG. 4.

In the detection process (step 16 of FIG. 1a and flow chart of FIG. 2a), first, a subsampling of the grey scale image to generate a smaller grey scale image (Gs) which is shown in FIG. 6 is preformed. This is followed by thresholding the grey scale image (Gs) (step 20, FIG. 2a) with a fixed threshold value to generate a binary image (Bs). The resultant binary image (Bs) is shown in FIG. 7. Applying a binary image erosion operation, (step 21, FIG. 2a) results in image Es, where small characters and thin lines are removed and most of the remaining black pixels are within the regions of photographs as shown in FIG. 8. The bounding boxes of each object in the image (Es) is detected by a connected component (step 22, FIG. 2a) which groups the connected black pixels of a binary image as an individual object (see, for example, U.S. Ser. No. 08/739,076). Excluding the small objects (step 23, FIG. 2a), the potential photographic bounding boxes 100 are shown in FIG. 9. The bounding coordinates are transformed into full resolution and shown in FIG. 10. The four bounding boxes 100 are the locations of detected photographs. The photographs in the detected bounding boxes may not be all rectangular shape.

Figure 2B:
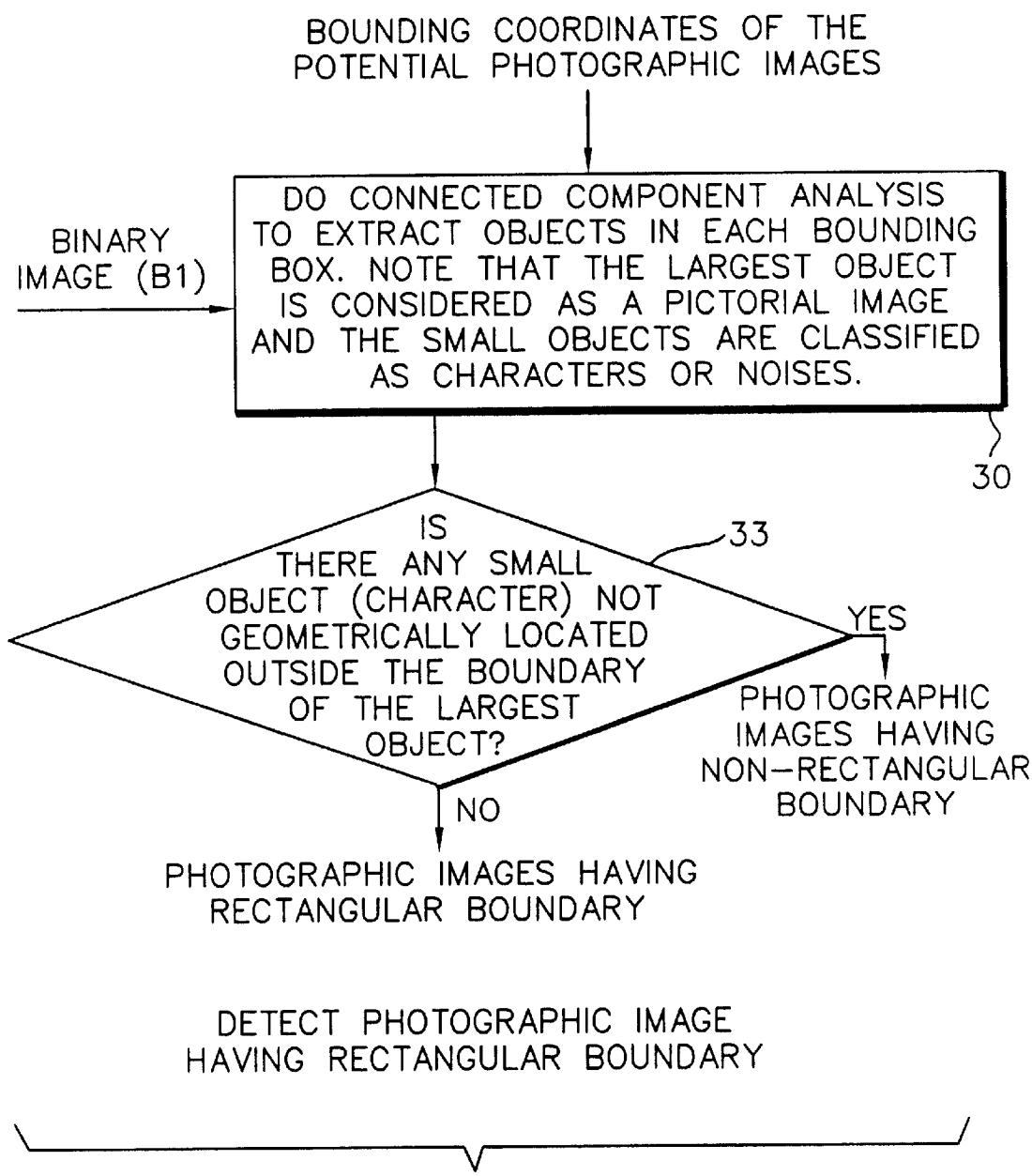
FIG. 2b is a flowchart outlining the steps of detecting photographic images with rectangular shapes or boundaries.
Figure 11:
FIG. 11 is an example of a bounding box containing texts for a non-rectangular photograph.

The next step is to detect rectangular photographic objects (step 17 of FIG. 1a) in the locations of the four bounding boxes 100. The detection is made by examining any characters within a detected bounding box in the binary image (B1) FIG. 3. If there exists any character in a bounding box, the photograph in the bounding box is classified as non-rectangular. On the other hand, if there is no character found in a bounding box, then the photograph in the bounding box is considered as a rectangular photograph. In the example, there are characters within bounding box 100' for the sunglass graphics, as shown in FIG. 11. Hence the graphics of the sunglasses is considered as a non-rectangular photograph. The remaining other three bounding boxes do not contain characters and the photographs they contain are classified as rectangular. The specifics of the detection of photographic images with rectangular shapes or boundaries (step 17, FIG. 1a) is shown in FIG. 2b. As illustrated in FIG. 2b, information concerning the boundary coordinates of the potential photographic images as well as binary image (B1) are considered with respect to a connected component analysis (step 30). In step 30, a connected component analysis is done to extract objects in each boundary box. It is noted that the largest object is considered as a pictorial image and the small objects are classified as characters or noises. In step 33, a determination is made to check to see if there is any small object (character) not geometrically located outside the boundary of the largest object. If the answer to step 33 is yes, the objects are photographic images having a non-rectangular boundary. If the answer to step 33 is no, the objects are photographic images having a rectangular boundary.

Figure 12:
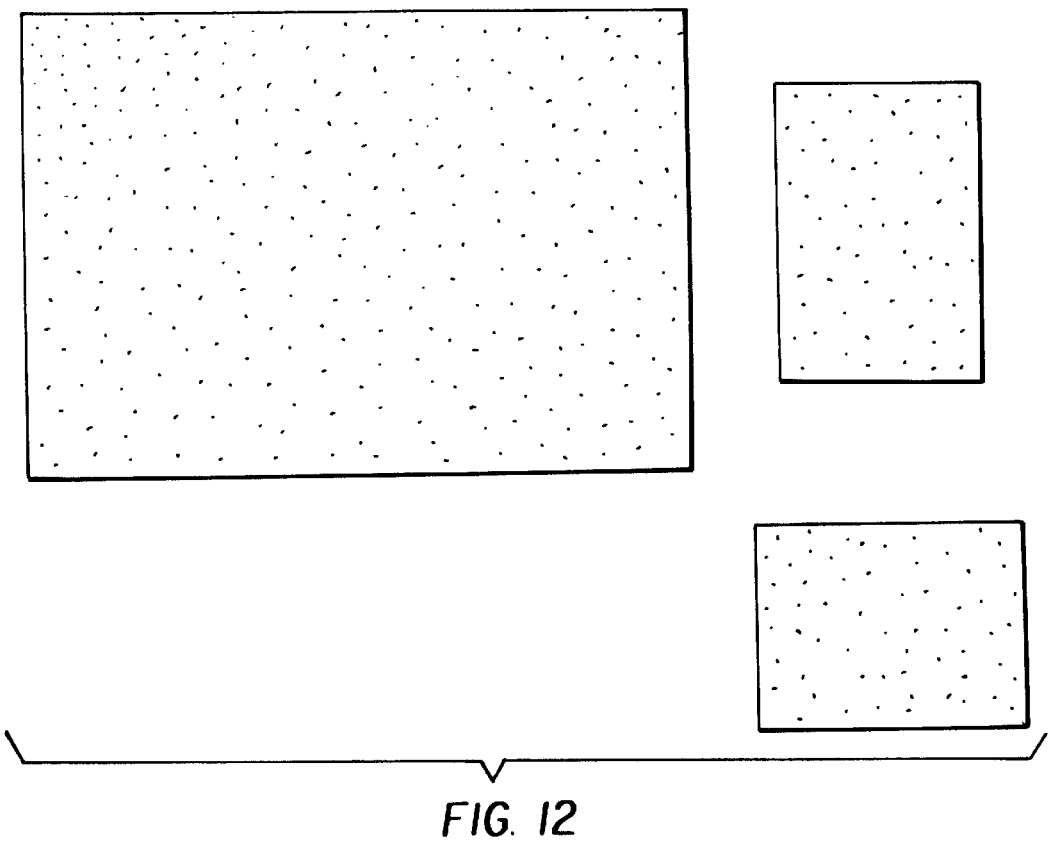
FIG. 12 is a bitmap indicating the detected regions of the rectangular photographs.

The classification map is then generated (step 18, FIG. 1a) by filling in black pixels in the bounding regions of the three rectangular photographs as shown in FIG. 12. The final binary image (B) is composed of binary images (B1) and (B2) based on the classification map. The pixel in the image (B) is a copy of the image (B1) in the text regions of the classification map, and in photographic regions (black regions in the classification map) the image (B) is a copy of the image (B2). The result is shown in FIG. 13.

The invention has been described in detail with particular reference to certain preferred embodiments thereof, but it will be understood that variations and modifications can be effected within the spirit and scope of the invention.

What is claimed is:

1. A region-based binarization method comprising the steps of:

converting a gray scale image into first and second binary images;

detecting a location of photographic images in said gray scale image;

identifying photographic images of said detected photographic images which have a rectangular boundary;

generating a classification map which distinguishes pixels in the photographic images having a rectangular boundary from remaining pixels;

forming a final binary image from said first and second binary images based on said classification map;

subsampling the gray scale image to acquire a subsampled image, such that said detecting step comprises detecting the location of photographic images in said subsampled image; and wherein said subsampled image is a low resolution image.

2. A method according to claim 1, wherein said gray scale image is captured from a document which contains at least photographic portions and text portions.

3. A method according to claim 1, wherein said converting step comprises the steps of:

applying an adaptive thresholding technique to said gray scale image to obtain one of said first and second binary images; and applying an image rendering technique to said gray scale image to obtain the other of said first and second binary images.

4. A method according to claim 3, wherein said image rendering technique comprises an error diffusion process.

5. A method according to claim 3, wherein said image rendering technique comprises a dithering process.

6. A method according to claim 1, wherein said detecting step comprises the steps of:

converting said subsampled image into a further binary image;

removing thin lines and characters from said further binary image;

performing a connected component analysis to said further binary image so as to group connected pixels in said further binary image, wherein groups of connected pixels are identified as an object in said further binary image; and designating objects in said further binary image which have a size that is larger than a threshold value as photographic image.

7. A method according to claim 6, wherein said designated step comprises the step of using a size filter to designate objects which are larger than said threshold value as photographic images and to exclude objects which are smaller than said threshold value.

* * * * *